No. 763,630. PATENTED JUNE 28, 1904.
D. T. PHILLIPS.
CORN HARVESTER.
APPLICATION FILED JAN. 6, 1904.
NO MODEL. 4 SHEETS—SHEET 1.
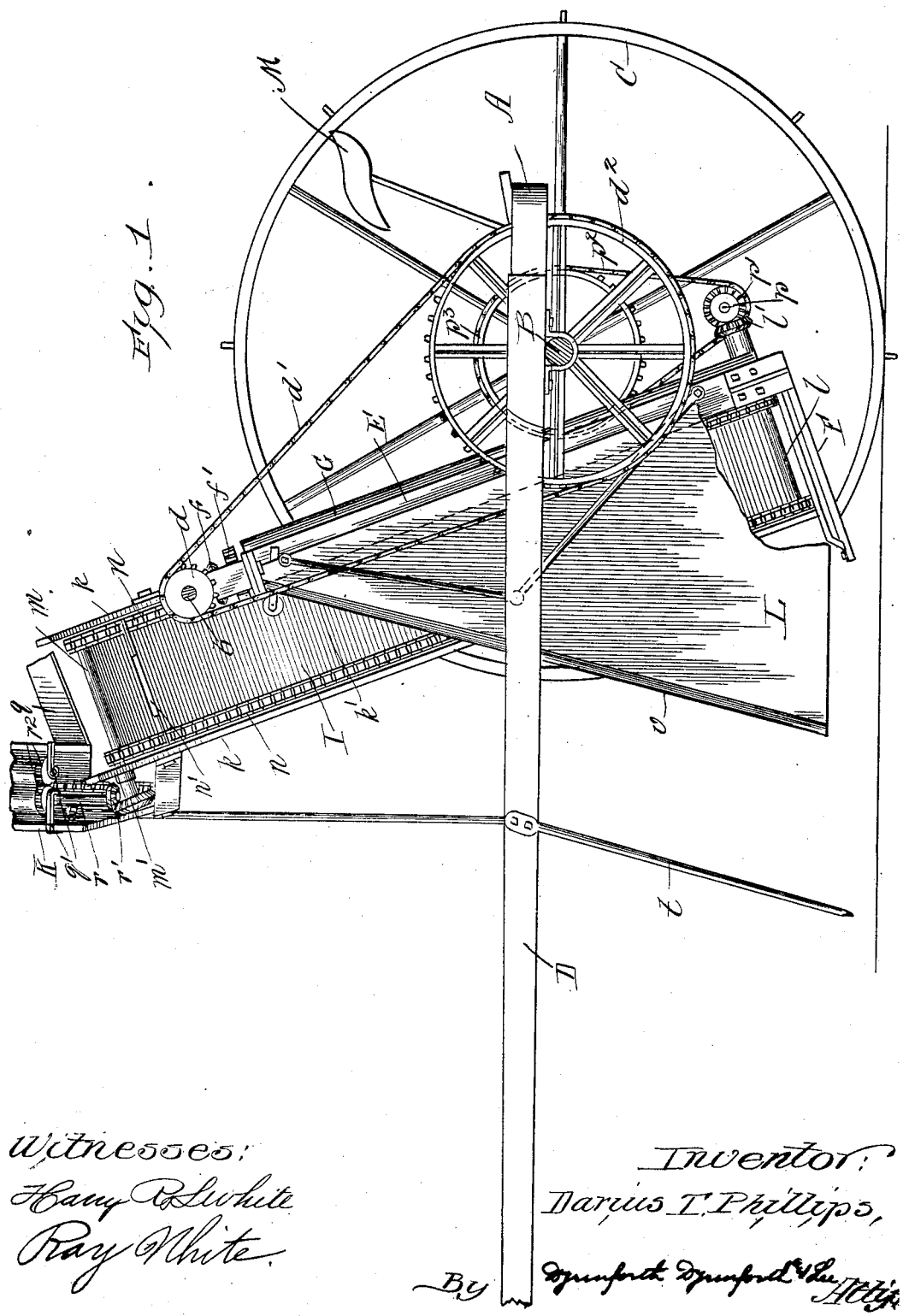
Witnesses:
Harry R. White
Ray White
Inventor:
Darius T. Phillips,
By Dynforth Dynforth & Lee
Attys.

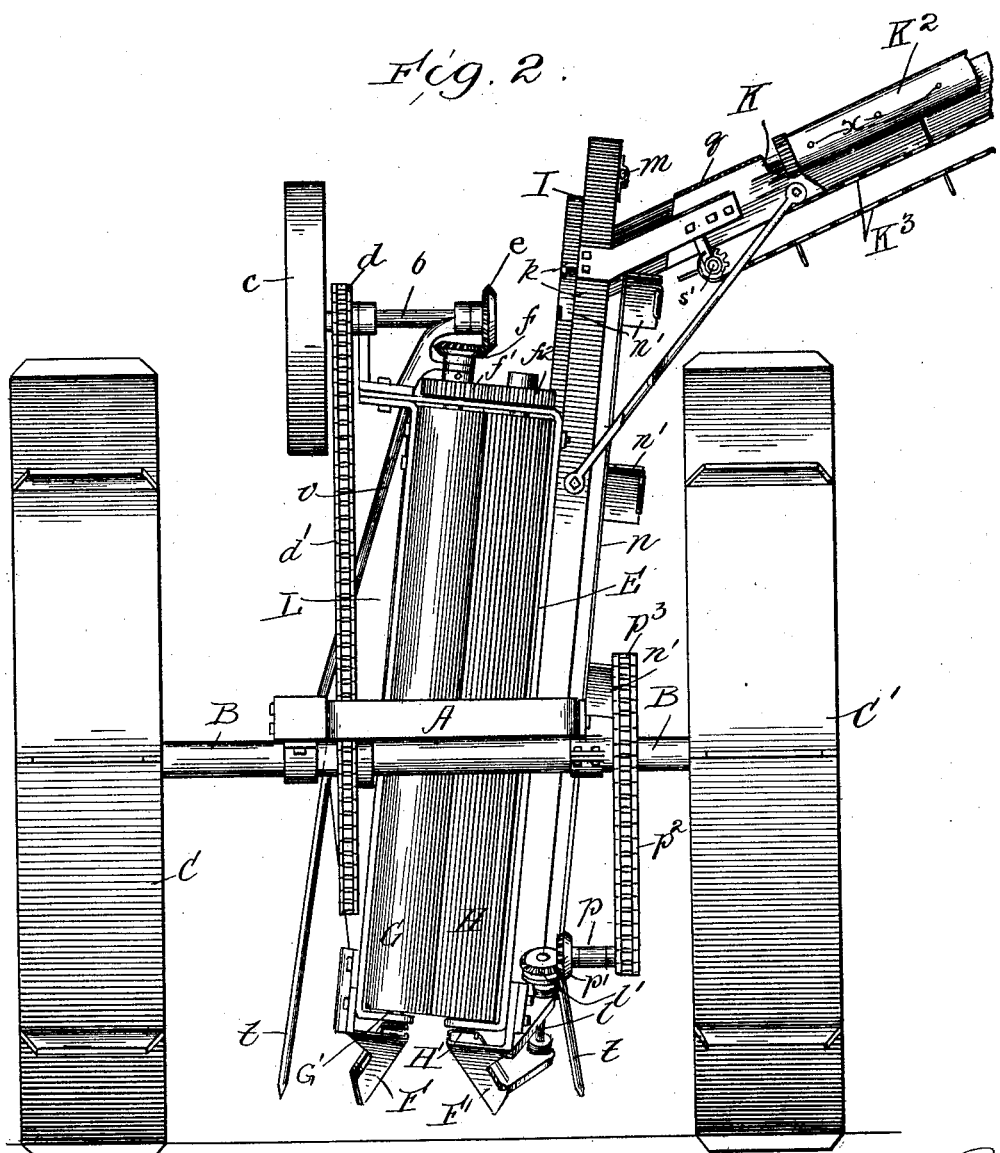

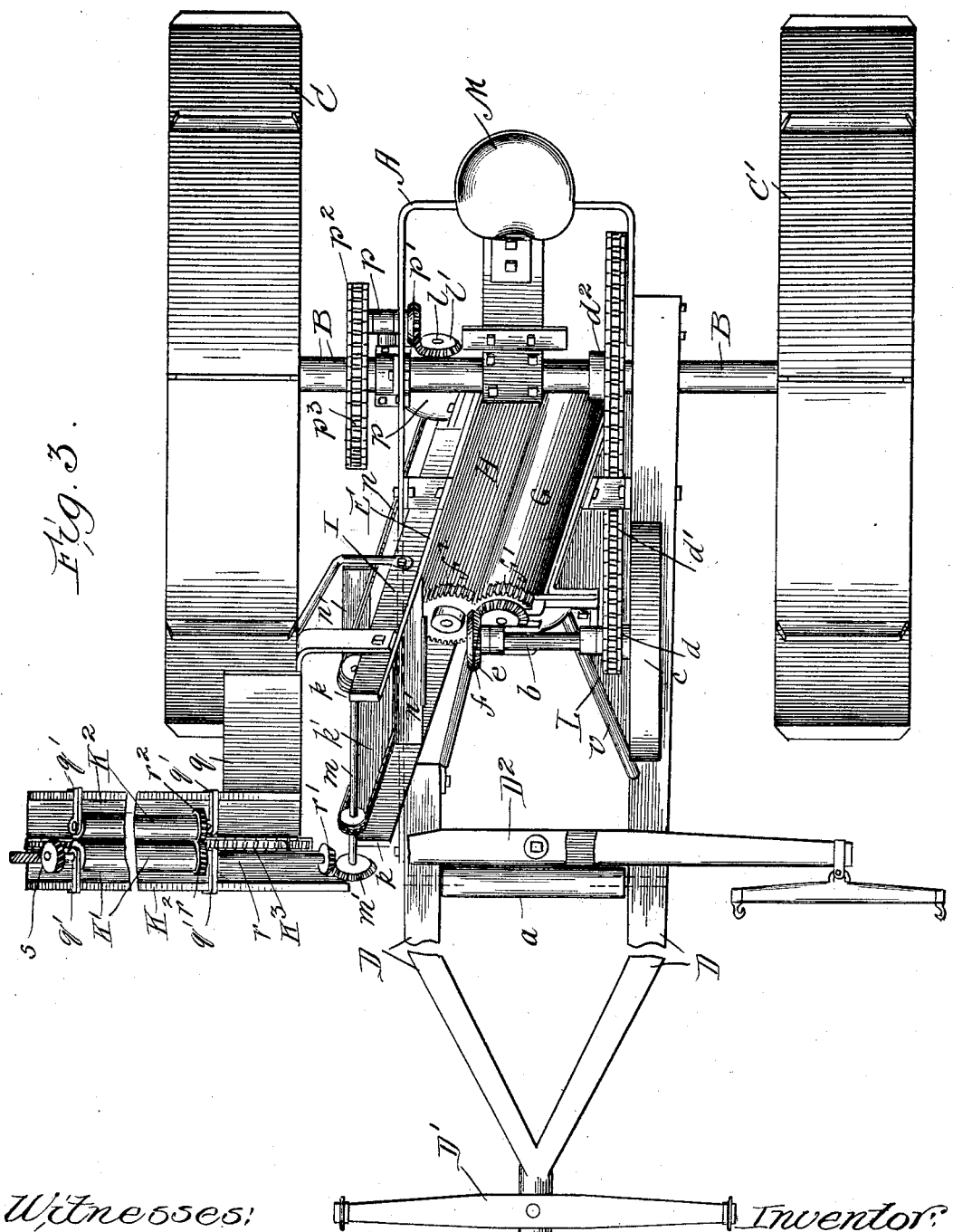

No. 763,630. PATENTED JUNE 28, 1904.
D. T. PHILLIPS.
CORN HARVESTER.
APPLICATION FILED JAN. 6, 1904.
NO MODEL. 4 SHEETS—SHEET 4.
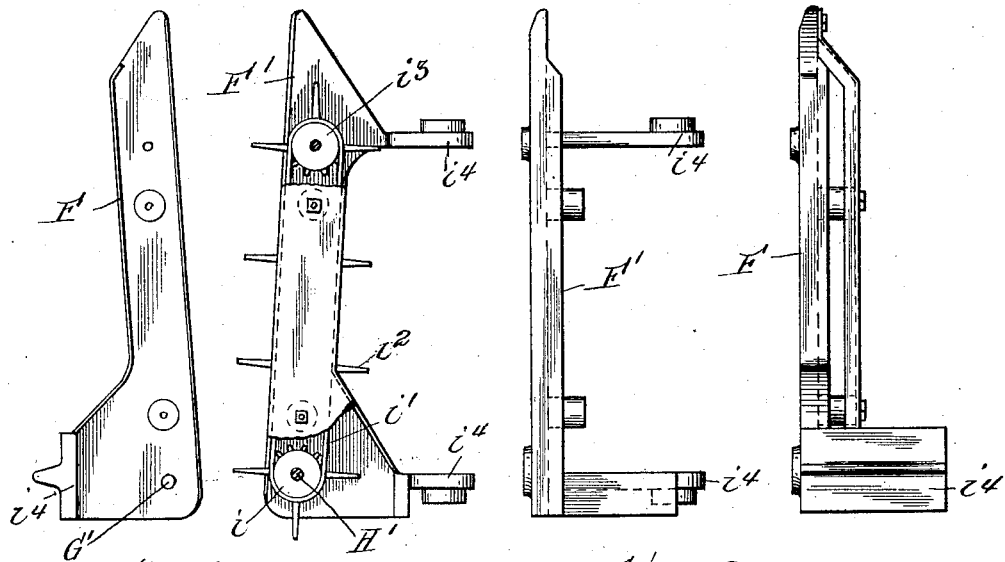
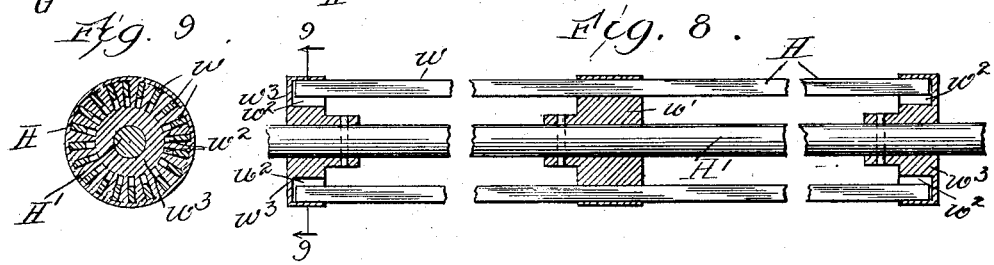
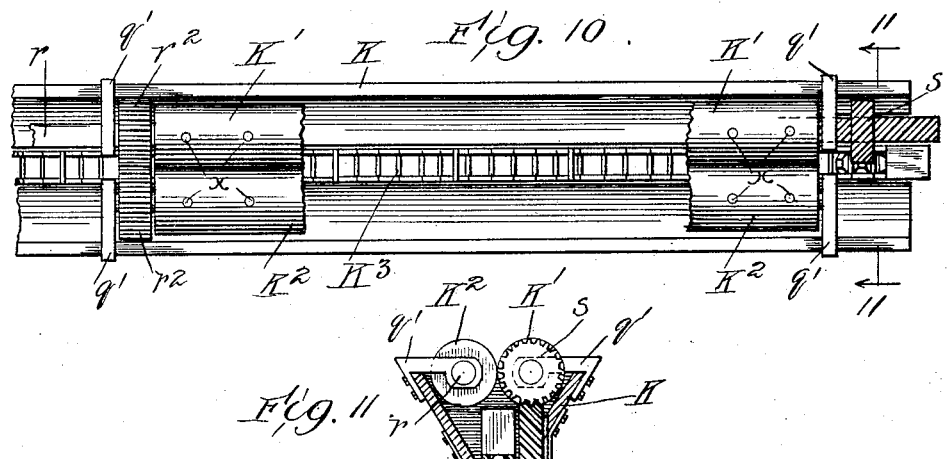
Witnesses:
Harry P. White
Ray White
Inventor:
Darius T. Phillips
By Dynforth Dynforth and Lee Attys.

No. 763,630.                                              Patented June 28, 1904.

UNITED STATES PATENT OFFICE.

DARIUS T. PHILLIPS, OF CHICAGO, ILLINOIS, ASSIGNOR OF ONE-HALF TO
FRANK C. STEVENS, OF CHICAGO, ILLINOIS.

CORN-HARVESTER.

SPECIFICATION forming part of Letters Patent No. 763,630, dated June 28, 1904.

Application filed January 6, 1904. Serial No. 187,947. (No model.)

*To all whom it may concern:*

Be it known that I, DARIUS T. PHILLIPS, a citizen of the United States, residing at Chicago, in the county of Cook and State of Illinois, have invented a new and useful Corn-Harvester, of which the following is a specification.

My invention relates to improvements in machines for use in gathering the ears of corn from the standing cornstalks; and my object is to provide such a machine of generally improved construction whereby it will be easy-running and positive and certain in its operation.

My object is further to provide, in connection with the ear-gathering machine, husking mechanism of improved construction whereby the ears may be discharged from the machine fully husked.

It is still further my object to provide an ear gathering and husking machine which will be of simple, strong, durable, and desirable construction.

Referring to the drawings, Figure 1 is a partly-sectional side view of my improved corn harvesting and husking machine with certain parts broken away; Fig. 2, a broken rear-end view; Fig. 3, a top plan view; Fig. 4, a plan view of one of a pair of relatively flaring stalk-guides; Fig. 5, a similar view of the other of said guides with parts of the casing broken away to expose details which would otherwise be hidden; Fig. 6, an edge view of the guide shown in Fig. 5; Fig. 7, an edge view of the guide shown in Fig. 4; Fig. 8, a broken longitudinal section of one of a pair of snapping-rollers; Fig. 9, a section taken on line 9 in Fig. 8 and viewed in the direction of the arrow; Fig. 10, a broken sectional plan view of the ear-husking mechanism, and Fig. 11 a section taken on line 11 in Fig. 10 and viewed in the direction of the arrow.

The main frame A of the machine is pivotally mounted toward its rear end upon an axle B, on which are fixed the wheels C C'. Journaled in the forward end of the frame in the plane of and parallel with the axle B is a roller $a$. Also attached to the frame are long forward-extending side bars or shafts D D, coming together at their free ends and there provided with a whiffletree D' or other suitable means for hitching to a draft-animal. On the frame above the roller $a$ is an an evener D², with means at opposite ends for attachment to a draft-animal. Integral with the main frame A in the position shown is a forward and laterally inclined frame E, open at its lower end and there provided with relatively flaring and forward-inclined guides F F'. Journaled in the frame E is a pair of parallel snapping-rollers G H. The shafts G' H' are journaled in bearings in the upper and lower ends of the frame E and extend at each end beyond said bearings. Journaled in suitable brackets on the upper end of the frame E is a horizontal shaft $b$, carrying a fly-wheel $c$ and a sprocket-wheel $d$ toward one end and a bevel-gear $e$ at the opposite end. The sprocket-wheel $d$ is geared, by means of a drive-chain $d'$, with a large driving sprocket-gear $d^2$ on the axle B. The bevel-gear $e$ meshes with the bevel-gear $f$ on the shaft G' of the roller G. Also on the shaft G', toward the upper end, is a pinion $f'$, meshing with a pinion $f^2$ on the shaft H' of the roller H. Thus in the rotation of the axle B the snapping-rollers G H are rotated. At the lower end of each roller-shaft G' H' is a sprocket-wheel $i$, driving a conveyer-belt $i'$, provided with fingers $i^2$. The conveyer-belts $i'$ are in casings or chambers on the guides F F' and run around sprocket-wheels $i^3$ toward the outer ends of the said guides. Thus in the rotation of the snapping-rollers the conveyers on the guides F F' are caused to travel at their inner sides in the backward direction, their fingers extending beyond the inner edges of the guides, as indicated in Fig. 5.

At the side of the roller H and fastened to the main frame A and frame E is an elevator-frame I, extending upward in a forward and outward inclined direction from the rear of the guide F'. The frame I is formed with side strips $k\ k$ and a backboard $k'$. Journaled in bearings $i^4\ i^4$ on the guide F' is a lower elevator-shaft $l$, and journaled on the side strips $k$ at the upper end of the backboard $k'$ is an upper elevator-shaft $m$. The said elevator-shafts are provided toward opposite ends with sprocket-wheels for parallel endless elevator-chains $n$, carrying between them at intervals elevator cups or scoops $n'$. Journaled in a bracket $p$ on the lower end portion of the elevator-frame is a short shaft, carrying at one end a bevel-gear $p'$ and at its opposite end a sprocket-pinion, geared, by means of a drive-chain $p^2$, with a sprocket-wheel $p^3$ on the axle B. The bevel-gear $p'$ meshes with a bevel-gear $l'$ on the lower elevator-shaft, whereby in the turning of the axle B the elevator-chains are moved in the upward direction on the inner side of the board $k'$. At the upper end of the elevator-frame is a platform $q$, pitching downward into the end portion of an outwardly-extending upwardly-inclined trough K, open along the bottom. In the trough are longitudinally-extending husking-rollers $K'$ $K^2$, journaled at opposite ends in brackets $q'$, fastened to the sides of the trough. The shaft $r$ of the husking-roller $K'$ extends to the inner end of the trough and there carries a beveled pinion $r'$, meshing with a similar pinion $m'$ on the end of the upper elevator-shaft $m$. The rollers are also provided with intermeshing gears $r^2$, whereby the roller $K^2$ is driven from the roller $K'$. Beneath the free end portion of the trough K is a short cross-shaft, connected with the shaft $r$ by a right-angle gear $s$. Running along the open base portion of the trough K is a conveyer-chain $K^3$, extending around a sprocket-wheel on the said cross-shaft and around a similar sprocket-wheel $s'$, journaled on the trough adjacent to the elevator. All the framework described is suitably braced by rods, as shown in the drawings.

On the bars D are downwardly-extending relatively flaring stalk-deflecting rods $t$, and extending upward and forward from the guide F is a shield or deflecting-wing L, of sheet metal or the like, having a rounded or beaded forward edge $v$.

The snapping-roller H is formed with a yielding peripheral surface portion consisting of a plurality of parallel bars $w$, of springy material. Midway between their ends the bars pass through openings in a cylindrical bearing-head $w'$ on the roller-shaft H' and at their opposite ends extend loosely into radial slots $w^2$ in end cylindrical bearing-heads $w^3$ on the shaft H'. The end and center heads present short unyielding annular surfaces; but the bars $w$, being, as before stated, of springy material, may yield inward at their free ends in the radial slots $w^2$. On the rear end of the main frame is a driver's seat M, supported as indicated in Figs. 1 and 3.

The machine is drawn across the field by horses traveling at opposite sides of a row of corn, and the whiffletree D' and forward ends of the side bars D move against the upper flexible parts of the stalks, which are bent down and overridden by those parts. The standing stalks are engaged in the same way by the roller $a$ and after release thereby naturally spring upward to stand more or less upright. The machine is drawn along so that the stalks will enter between the guides F F'. The deflecting-wing L pitches inward, as indicated in Fig. 3, and extends at its rear edge in an upward-inclined direction parallel with the snapping-rollers, thus operating to deflect and guide the more or less upright stalks into the bite of the said rollers. By reason of the fact that the snapping-rollers incline forward, as shown, they operate to engage the upper parts of the stalks of each hill and gradually move down the stalks as the latter pass through. The rollers squeeze the stalks between them, and as ears move into the bite they are snapped off. In the rotation of the snapping-rollers the bars $w$ of the roller H will yield more or less under the pressure of the engaged stalks and present yielding cutting edges, which tend to pinch and weaken the stems of the ears and facilitate the snapping operation. It also has the effect, in most cases at least, of causing the stems and the larger part of the husks of the ears to be detached from the latter and remain on the stalks and pass therewith between the snapping-rollers. As the snapping-rollers pitch toward the elevator, as shown in Fig. 2, the ears when snapped off and dropped vertically will fall into the elevator-scoops and be raised thereby and deposited upon the platform $q$. From the said platform they roll naturally into the trough K in front of the lower or inner ends of the husking-rollers $K'$ $K^2$. There the ears are engaged by the chain $K^3$ and moved longitudinally along the bite at the under side of said rollers. The husking-rollers as I prefer to provide them have short projecting husk-engaging pins $x$. The upper stretch of the chain $K^3$ is naturally yielding and operates to press the ears while moving them yieldingly into the bite at the under sides of the husking-rollers. The pins $x$ loosen and engage any husks that may be upon the ears, the husks being drawn through the rollers so that the ears will be freed therefrom as they move to the upper or discharge end of the conveyer-trough K. I have shown and described a pair of snapping-rollers, one of which, the roller G, is plain, and the other, H, formed with radially-yielding bars.

The snapping-rollers, as clearly shown in Figs. 1 and 3, pitch forward but slightly, so that in operation the stalks of but one hill will be engaged by the rollers at a time. Thus the power required to operate the snapping-rollers is much less than is the case, more especially, where the rollers are backward inclined and work upon the stalks of more than one hill at a time. The stalks are drawn through the snapping-rollers from the under inclined sides of the latter, so that the ears as they are snapped off drop without obstruction into the elevator-scoops. This is an advantage over machines wherein the ears are snapped off at the upper sides of more or less horizontally-extending rollers, because in such machines it is difficult to cause the ears to fall accurately and necessitates the provision of comparatively wide troughs or receptacles to catch the falling ears.

As constructed the machine involves comparatively few parts and is particularly strong and easy-running. I do not limit my invention to the exact construction of the machine as shown and described, because it may be variously modified in the matter of details without departing from the spirit of my invention as set forth in the claims.

What I claim as new, and desire to secure by Letters Patent, is—

1. In a corn-snapping machine, a snapping-roller formed with an annular series of closely-adjacent peripheral longitudinally-extending bars, unyielding at their centers and radially yielding at their opposite ends, substantially as and for the purpose set forth.

2. In a corn-snapping machine, a snapping-roller formed with an annular series of peripheral longitudinally-extending bars of springy material, held at their centers to yield radially inward at their opposite ends, substantially as set forth.

3. In a corn-snapping machine, a snapping-roller comprising a shaft, a central cylindrical bearing-head on the shaft provided with an annular series of openings, bars of springy material extending longitudinally of the shaft through and held by said openings, and end cylindrical heads on the shaft loosely housing the end portions of said bars, whereby the latter may yield radially inward toward the shaft, substantially as and for the purpose set forth.

4. In a corn-snapping machine, a snapping-roller comprising a shaft, a central cylindrical bearing-head on the shaft provided with an annular series of openings, bars of springy material extending longitudinally of the shaft through and held by said openings, and end cylindrical bearing-heads provided in their inner faces with radially-disposed guide-sockets into which the ends of said bars extend and in which the said ends may yield radially inward toward the shaft, substantially as and for the purpose set forth.

DARIUS T. PHILLIPS.

In presence of—
WALTER N. WINBERG,
F. M. WIRTZ.